US006338037B1

(12) United States Patent
Todd et al.

(10) Patent No.: US 6,338,037 B1
(45) Date of Patent: *Jan. 8, 2002

(54) AUDIO SIGNAL IDENTIFICATION USING CODE LABELS INSERTED IN THE AUDIO SIGNAL

(75) Inventors: Martin Peter Todd, Hayes; Nigel Johnson, Windlesham, both of (GB)

(73) Assignee: Central Research Laboratories Limited, Middlesex (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,449

(22) PCT Filed: Jan. 14, 1997

(86) PCT No.: PCT/GB97/00100

§ 371 Date: Jan. 11, 1999

§ 102(e) Date: Jan. 11, 1999

(87) PCT Pub. No.: WO97/33399

PCT Pub. Date: Sep. 12, 1997

(30) Foreign Application Priority Data

Mar. 5, 1996 (GB) ............................................ 9604659

(51) Int. Cl.[7] ................................................ G11B 23/28

(52) U.S. Cl. .......................... 704/500; 380/201; 705/58

(58) Field of Search ................................ 704/205, 500; 380/3, 236, 237, 238, 253, 201, 202, 203; 348/486; 360/60, 43, 53; 705/57, 58

(56) References Cited

U.S. PATENT DOCUMENTS

| | | | | | |
|---|---|---|---|---|---|
| 3,674,939 | A | * | 7/1972 | Brooks | 704/205 |
| 3,845,391 | A | | 10/1974 | Crosby | |
| 3,897,379 | A | * | 7/1975 | De Francesco et al. | 360/27 |
| 3,952,164 | A | * | 4/1976 | David et al. | 704/205 |
| 4,357,634 | A | * | 11/1982 | Chung | 360/40 |
| 4,622,680 | A | * | 11/1986 | Zinser | 704/205 |
| 4,706,282 | A | * | 11/1987 | Knowd | 360/53 |
| 4,876,617 | A | * | 10/1989 | Best et al. | 360/60 |
| 5,113,437 | A | * | 5/1992 | Best et al. | 380/3 |
| 5,629,739 | A | * | 5/1997 | Dougherty | 348/486 |

FOREIGN PATENT DOCUMENTS

| | | |
|---|---|---|
| EP | 0 135 192 | 3/1985 |
| EP | 0 366 381 | 5/1990 |
| WO | WO 95/27349 | 10/1995 |

* cited by examiner

*Primary Examiner*—William Korzuch
*Assistant Examiner*—Martin Lerner
(74) *Attorney, Agent, or Firm*—Crowell & Moring LLP

(57) ABSTRACT

In an arrangement for decoding code labels embedded in audio signals by inserting signal bursts at selected frequencies into notch frequencies in the audio signal, problems of speed variations in the device producing the audio signal creating notch frequency variation are overcome by providing a plurality of decoders in parallel receiving an incoming signal, each decoder having notch frequencies incrementally displaced from those of the other decoders.

5 Claims, 4 Drawing Sheets

------- ENCODER NOTCH FILTER
——— DECODER BANDPASS FILTER
------- ICE DATA SPECTRUM

------ ENCODER NOTCH FILTER
——— DECODER BANDPASS FILTER
------- ICE DATA SPECTRUM

------ ENCODER NOTCH FILTER
——— DECODER BANDPASS FILTER
------- ICE DATA SPECTRUM

AUDIO SIGNAL IDENTIFICATION USING CODE LABELS INSERTED IN THE AUDIO SIGNAL

FIELD OF THE INVENTION

The present invention relates to labelled audio signals to enable subsequent identification, and in particular to the decoding of code labels embedded within audio signals.

Code labelling of audio and/or video sound track recordings commonly occurs to indicate the origins of the recordings, or the owner of the copyright in the recordings, or both. The labelling may also provide information as to payment of copyright royalties due.

BACKGROUND ART

Our earlier patent EP-B-0245037 and our International Patent Application PCT/GB95/03035 (corresponding to Patent EP 081855) both relate to apparatus for the labelling of an audio signal, comprising two notch filters to form notches at specified first and second frequencies; code generating means to produce a code label signal for the audio signal, having a plurality of bits, a "one" bit value represented by a burst at the first frequency and a "zero" bit value being represented by a burst at the second frequency, the code being inserted into the audio signal at the notch frequencies at a predetermined amplitude level relative to the audio signal. When for example the audio signal is broadcast, and a received signal is decoded, complementary band pass filters at the first and second frequencies are operative to extract the frequency bursts, and the signal is then decoded.

Our patent EP 0366 381 proposes a signal encoding means for embedding code signals in an audio signal recorded on an audio track. In order to make it more difficult for a defrauder to locate the code signals, the system proposed to eliminate the creation of a predictable sequence of notch frequencies where the code signal is embedded, by generating a sequence of notch frequencies which varies throughout the audio sound track recording. The system proposes the use of wide pass band filters to accommodate fluctuations in the speed of the recording mechanism.

Usually, the code label signal consists of two digital words, each word including an initial portion comprising a simultaneous burst of both frequencies. A data portion then follows comprising bursts of either the first or the second frequency to represent a "1" bit or a "0" bit. More than one digital word may be necessary on account of the amount of data to be inserted if the International Standard Recording Code (ISRC) is to be represented.

It has been found that the decoding of such a coded audio signal is sensitive, where say the audio signal results from the playing of a tape or a CD, to speed variations in the tape or CD playing mechanism, resulting in variations in the values of the first and second code frequencies, since the code label frequencies will also be recorded on the CD or tape. Significant losses of accurately decoded code signals may result for speed changes at or beyond ±0.5%. This figure of 0.5% depends on the dimensions of the coding notch and decoding band pass filter widths in use. The problem of speed variation might in principle be resolved by the use of wider filters having less speed sensitivity as proposed in our European Patent 0366 381. But wider filters create more risk of the code insertion process producing audible artefacts. Although there are different causes for speed variation, for example wow and flutter type speed variations, the present invention is particularly concerned with constant speed errors such as may occur with a variable speed CD player when a radio station speeds up the CD by a percent or two to squeeze the record in before the end of a programme.

SUMMARY OF THE INVENTION

In order to overcome problems of variations in the frequencies at which code labels are present in audio signals, the present invention contemplates a decoder for retrieving code label signals having a respective decoder pass band filter arrangement for each of the code frequencies, the pass band filter arrangement having a center frequency which is varied or selected from a number of possible values such that if the code frequency varies from the nominal value of the frequency, encoded code label signals can still accurately be received.

The present invention provides in one aspect apparatus for decoding code label signals encoded into audio signals, the code label signals comprising bursts of at least first and second specified frequencies, and the apparatus including a plurality of pass band filter arrangements, one for each of the specified frequencies, each pass band filter arrangement having a center frequency which can be varied or selected from a plurality of possible values such that if the respective code frequency varies from its nominal value, encoded code label signals can still accurately be received and decoded.

In one embodiment, the pass band filter arrangement comprises a tracking or adaptive filter whose center frequency is variable in dependence on the quality of the received signals, so that the filter can accurately follow the incoming code frequency. Usually, the tracking filters for the respective code frequencies will be ganged together so that they vary by the same amount and in the same direction, since frequency changes due to speed variations will affect all the code frequencies equally. In some circumstances however, it may be desirable to have independent tracking filters, where the code frequencies are likely to change by different amounts, for example as a result of changes introduced by signal processing.

However a tracking filter embodiment may not be suitable for short code signals, since there will be inevitably be an initial lock on time which may amount to a significant part of the code label duration. It is therefore presently preferred to employ pass band filter arrangement with a plurality of pass band filters with slightly different pass band frequencies values in a range closely surrounding the nominal audio frequency and arrange simultaneously to receive the audio signal. A suitable means is provided to select the best quality output from the filters. Thus effectively the value of the center frequency is selected from a plurality of values in dependence on the quality of received data.

It would be possible to multiplex the outputs of the filters to a single decoder, followed by a data selector for selecting the best quality data. Alternatively, the data selector would precede the decoder. However both of these alternatives would place heavy demands on the hardware, and it is therefore preferred to employ a plurality of decoders, comprising pass band filters and signal analysis means, arranged in parallel and outputting to a single data selector operative to select the best quality data. In a preferred example, four decoders may be employed, each decoder including a plurality of pass band filters for the respective code frequencies, each filter deviating by the same amount from the nominal code frequency.

BRIEF DESCRIPTION OF THE DRAWINGS

A preferred embodiment of the invention will now be described with reference to the accompanying drawings, wherein.

DESCRIPTION OF THE PREFERRED EMBODIMENT

Figure 1:
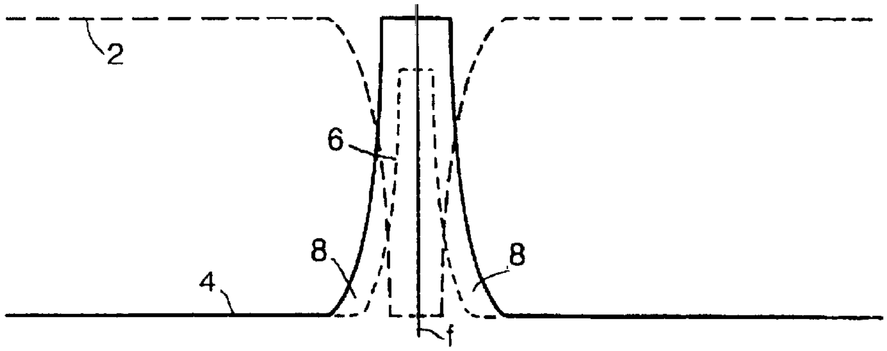
FIG. 1 is a diagrammatic view of filter functions showing normal operation of a decoder for decoding code label signals received at nominal operating frequencies.

Referring to the drawings, FIG. 1 shows the normal condition of filter characteristics when there are no speed changes in a tape or CD player unit reproducing an audio signal having code label signals embedded therein at two predetermined frequencies, one of which, f, is indicated in FIG. 1. An encoder notch filter has a center frequency f. As preferred two notch frequencies are employed, with the notch frequency accurate to 1 Hz. The filters in one embodiment are 50 dB deep and 150 Hz wide at the 3 dB point. It will be understood for the purposes of this specification, that although a notch filter rejects a band of frequencies, this is so small in relation to the entire audio bandwidth that the filter can be represented by specifying a single frequency at the midpoint of the range. The same applies to pass band filters in this specification.

In FIG. 1, a decoder pass band filter has an inverse characteristic 4 to that of notch filter 2. A code label data spectrum 6 lies wholly within function 2. The overlap of the encoder notch filter and decoder band pass filter results in some of the music signal appearing (at a low level) in regions 8 inside the pass band of the band pass filter. This is referred to as "music breakthrough" in that the music will break through into the band pass filter output and possibly interfere with the code detection process.

For data bandwidths of known code label signals, the data ones and zeros are each made up of 1000 cycles at the audio sampling rate of 44.1 kHz, i.e. each data bit lasts 22.7 ms and a sequence of 101010 etc. would have a basic frequency component at 22.05 Hz. This would appear in the notch as an amplitude modulation on a carrier at the notch center frequency—the total bandwidth being 44.1 Hz. This is represented by the fine dotted curve 6 in the figures. This energy must be recovered in order to decode the ICE data.

Figure 2:
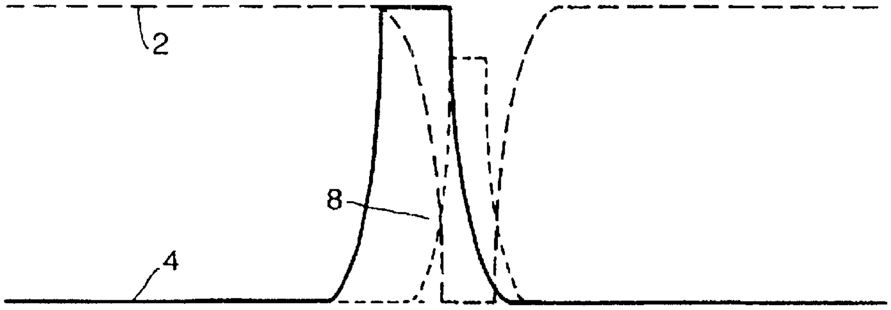
FIG. 2 is a diagram similar to that of FIG. 1, but showing the effect of an offset in the code label frequency.

FIG. 2 shows the situation where there has been a significant player speed offset applied to the audio signal and embedded code label before reaching the decoder. The effect of speed changes on a piece of audio is to multiply all the component frequencies by the percentage speed change. This, of course, includes the notches used for the code label. Unfortunately, to extract the code label data, the decoder of the prior art uses a fixed bandpass filter based on the nominal position of the encoder notches. In the event of speed changes the difference introduced between the position of the respective filters may result in loss of data. For example, a notch at 2000 Hz when subjected to a 1% speed increase will be moved to 2020 Hz. Given that the notch is only 50 Hz wide (at the bottom) this represents a significant change.

Figure 3:
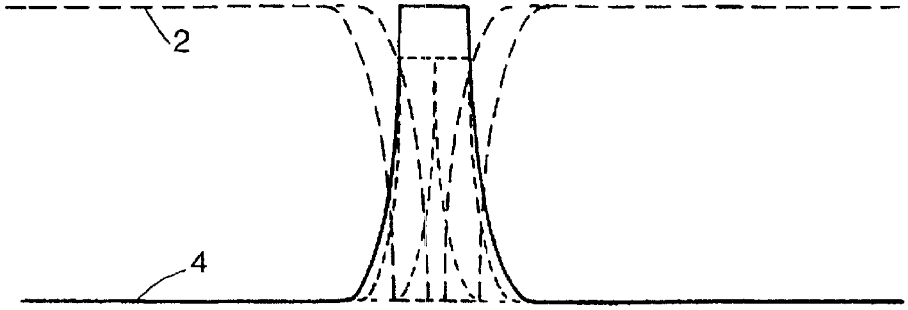
FIG. 3 is a diagram similar to that of FIG. 1 but showing the effect achieved with the present invention.

FIG. 2 represents an even greater change. It can be seen that, in this particular example, the data energy lies outside of the bandpass filter and that a large amount of music energy falls inside the bandpass filter. This would render the code label undetectable. FIG. 3 shows two overlaid plots for the situations when the speed offset is −0.5 and +0.5%. These indicate that some improvement may be achieved by making the sides of the bandpass filter steeper so as to reduce the amount of music breakthrough. Unfortunately the bandpass filter design is already optimised and further improvements would be difficult to achieve. An alternative would be to widen the notch filters. However, a major improvement could probably only be achieved by simultaneously introducing audible impairments into the audio signal.

In accordance with the invention, it is proposed to employ several decoders working in parallel, each having two passband filters for each code notch frequency, with a bandpass filter center frequency optimised for a different speed offset. For example, if the nominal center frequency is 2000 Hz, then −0.5% error would move this to 1990 Hz, while +0.5% would move it to 2010 Hz. Similarly +1.0% would move the center frequency to 2020 Hz.

There is an overlap range between filters so as to ensure that good data is always produced by at least one bandpass filter stage. Thus where the notch and bandpass filters have a width of about 1% of the code frequency, then the offset is about 0.5%. This will mean that, for at least some of the time, good data will result from at least two of the bandpass filter outputs. This system could be extended to any sensible number of parallel decoder elements limited only by complexity. Also it would be possible to allow for, say, higher positive speed errors than negative ones.

Figure 4:
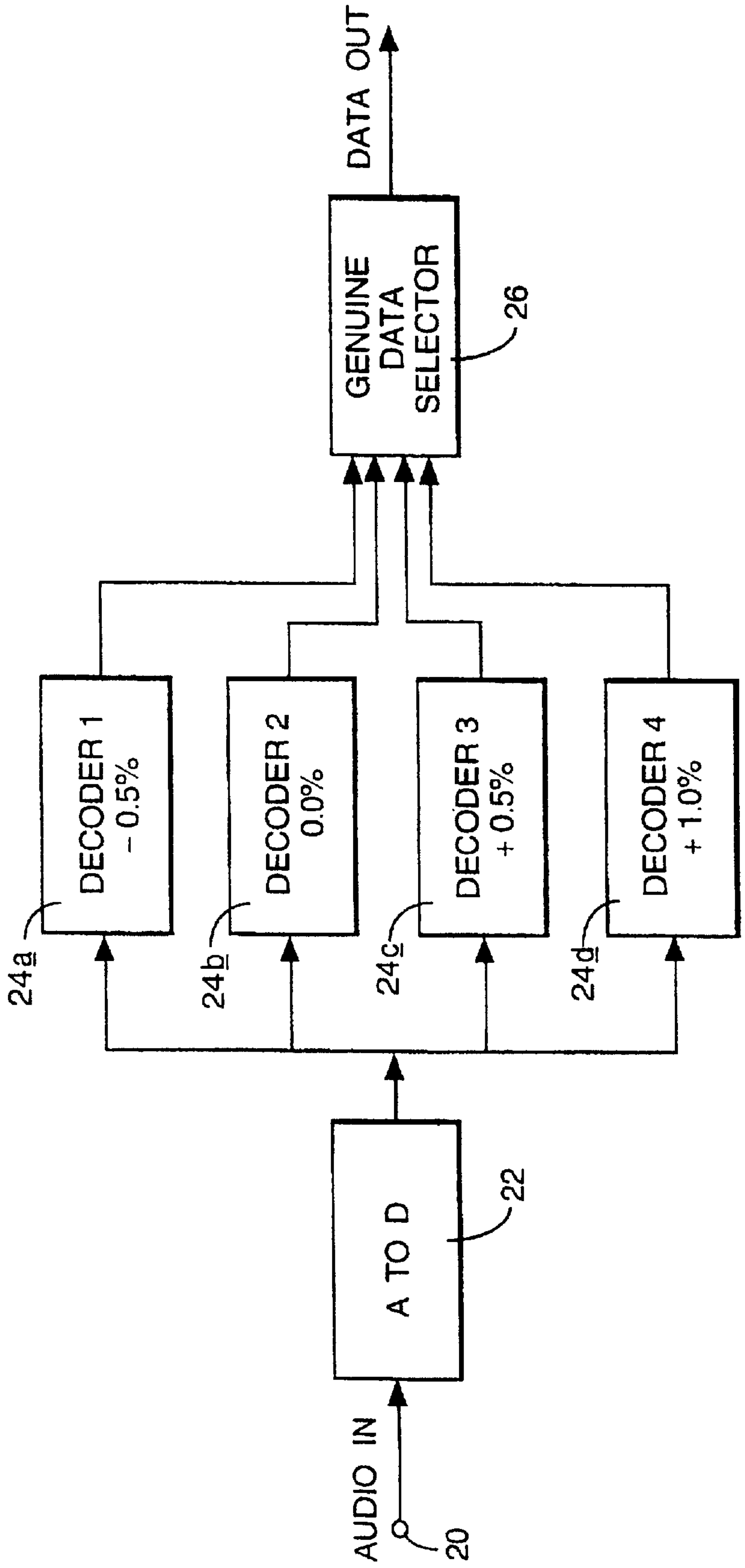
FIG. 4 is a block diagram of a preferred embodiment of the invention.

Referring now to the preferred embodiment of the invention shown in FIG. 4, a decoder is shown for decoding incoming audio signals having embedded codes therein at predetermined notch frequencies at an input 20. The audio signal is digitised in an analog to digital converter 22. The output is applied to four decoders 24 connected in parallel, the form of each decoder being shown in more detail in FIG. 5. Each decoder includes a pair of pass band filters for the respective code frequencies, where the centre frequencies of the pass band filters are offset by different amounts from the nominal frequency. Thus decoder **24*a* is set to the nominal frequency minus 0.5%, decoder 24*b* is set to the nominal frequency, decoder 24*c* to the nominal frequency plus 0.5%, and decoder 24*d*** to the nominal frequency plus 1.0%. FIG. 4 shows a block diagram for four sets of decoder filters. Since each decoder has a useful range of ±0.5% of the nominal frequency, this gives a range of −1% to +1.5%. The response ranges of the various bandpass filter channels would be as follows:

| Centre Speed | Centre Frequency (hZ) | Min Speed | Max Speed |
|---|---|---|---|
| −0.5% | 1990 | −1.0% | 0.0% |
| 0.0% | 2000 | −0.5% | +0.5% |
| +0.5% | 2010 | 0.0% | 1.0% |
| +1.0% | 2020 | +0.5% | +1.5% |

The outputs of the decoders 24 are coupled to a data selector 26 which is operative to select the best quality data output. Where the data incorporates an error correction code, then the data selector will select the data output with a valid error code. If the data does not contain an error correction code, then the data selector is operative to select the output having zero crossing points most closely aligned to the theoretical crossing points. Such a data selector may select two channels simultaneously as providing good data. In the event that two channels both produce error free data with, say, equal fit to the zero crossing points and/or other selection criteria, then it would not matter which was selected—indeed there would be no mechanism on which to base a choice decision—so either would do. A decision for selecting a particular channel is made whenever several outputs are "good" but not identical e.g. one channel contains more errors than the other, one channel contains no errors and the other has one or more errors, one has a better zero crossing fit than the other etc. etc.

In general the spacing of center frequencies between adjacent pass band filters should be such that the pass bands overlap. The overlap should be optimised so as to give the minimum overlap while allowing coverage of the full speed range. Minimising the overlap is important so as to keep the complexity down i.e. use the minimum number of decoders to cover a given speed range. For example, the bandpass filters of the decoders can be arranged with a wider spacing equivalent to 0.75% speed errors. This would give overlaps of 0.25% and a range for the above example of −1.25% to +2.0%.

As well as the center frequencies of the bandpass filters being offset as described above it is also necessary to allow for the fact that changes in speed will also affect the duration of each data bit. As given above, in the encoder a bit is set to 1000 cycles at 44.1 kHz. This timing is used in the decoder to look for transitions between data bits. However, if for example, the speed is changed by +1% then the bit duration also decreases by 1%. So this will now be equivalent to 990 cycles at 44.1 kHz. Hence decoders optimised for speed offsets must also be optimised to handled the modified data bit duration. If this were not done then loss of data would result from accumulated errors over the duration of a full data word.

Figure 5:
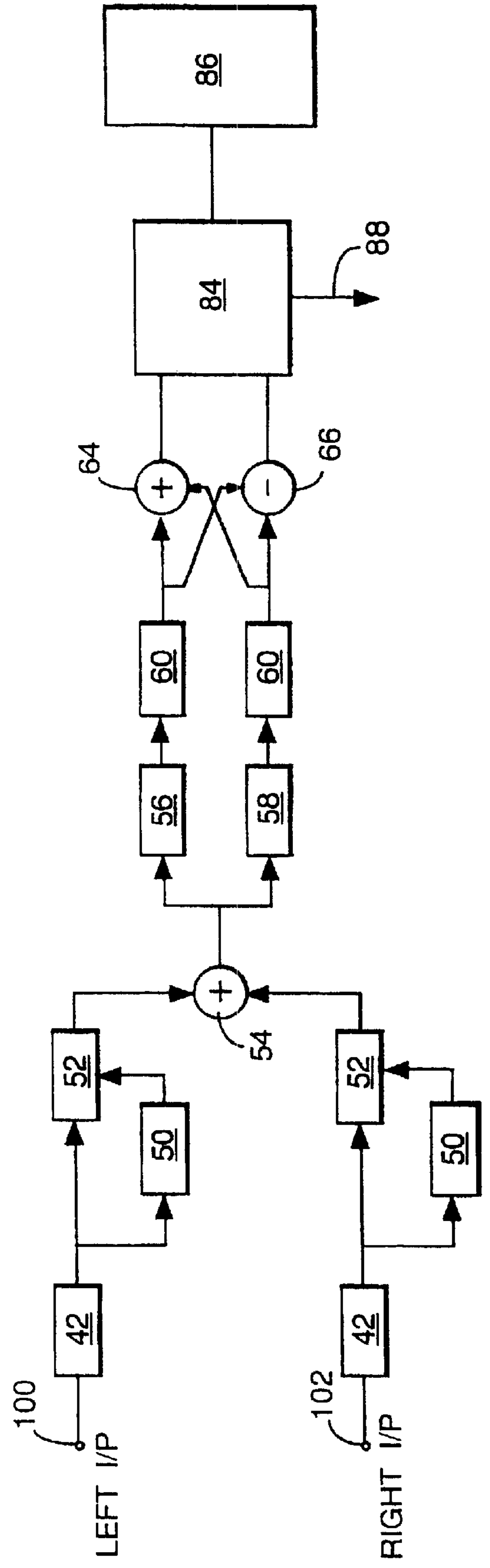
FIG. 5 is a more detailed diagram of the decoder unit of FIG. 4*i*.

Referring now to a more detailed view of a decoder as shown in FIG. 5, stereophonic coded audio signals are fed to the Left and Right inputs 100, 102, and gain controlled versions of these signals are produced by bandpass filters 42, rectifiers, and AGC units 52. The signals are summed as at 54, and band pass filtered versions of the summed signal are added and subtracted as in units 56–66. A code detector unit 84 operates on a bit-by-bit basis to identify incoming code signals, under the control of a controller 86. Thus the presence of signals from summer 64 represents synchronising pulses of an initial part of the code label whereas signals from subtractor 66 represent data bits of the information part of the code label. As mentioned above, each detector is optimised or preset to handle a modified bit duration, in addition to modifying the pass band frequencies. The detected code is output on line 88 to data selector 26, shown in more detail in FIG. 6.

Figure 6:
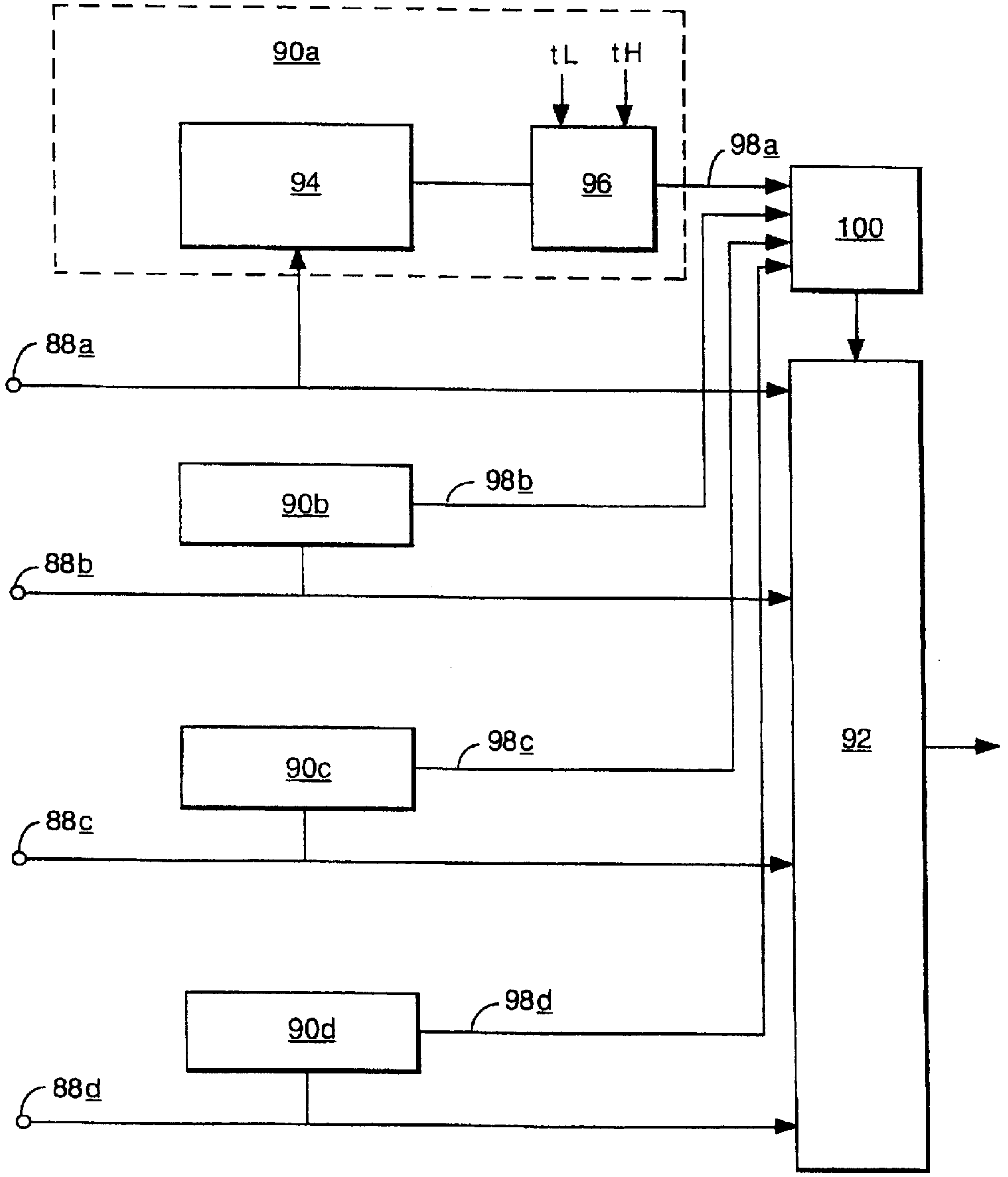
FIG. 6 is a schematic block diagram of a data selector of FIG. 4.

In FIG. 6, outputs 88*a*–*d* from the decoders are applied to respective assessor units 90*a*–*d*, and to a selector switch 92. Each assessor unit 90 includes a zero crossing detector unit 94 which extracts the data transition edges and computes an average value t of time interval between transitions. This value is compared in a threshold value unit 96 with a range of permissible values tL–tH to determine whether the data is at the appropriate rate for the data channel, and to provide an output signal at 98, which indicates how well the received data rate matches the expected rate for each channel. In a practical situation there may be two or even three decoders producing code simultaneously. The outputs 98 of the assessor units 90*a*–*d* are fed to a selector control 100 which provides an appropriate control signal to selector switch 92 to select the best code output.

The above embodiment is just one example of a range of measures that may be employed to extract the most appropriate set of data.

What is claimed is:

1. Apparatus for decoding a label signal encoded into audio signals, the label signals being encoded so as to appear at a predetermined frequency for a given playback speed, said apparatus including a filter arrangement having a first fixed band-pass filter with a first pass band centered on said predetermined frequency and at least one additional fixed band-pass filter, each of said at least one additional filter having a respective additional pass band which overlaps an adjacent pass band of an adjacent band-pass filter in said filter arrangement, wherein each of said at least one additional filter is centered on a frequency value different from said predetermined frequency, whereby the use of the first and said at least one additional filter compensates for playback speed variation around said predetermined frequency such that the label is still received and decoded.

2. Apparatus as claimed in claim 1 in which adjacent band-pass filters have center frequencies which differ by approximately 0.5% of the predetermined frequency, and pass bands of between 0.75% and 1.25% of the predetermined frequency.

3. Apparatus as claimed in claim 1 in which the outputs of the band-pass filters are coupled to data selector means for selecting the best quality data output from one of a valid error code, zero crossing points and from two channels.

4. Apparatus as claimed in claim 1 including means for analyzing label signals having a data bit length which varies in proportion to the change in frequency.

5. Apparatus as claimed in claim 3 in which the data selector means includes means for examining the decoded signals on a bit-by-bit basis and assessing whether the decoding is correct.

* * * * *